United States Patent
Natucci et al.

(10) Patent No.: US 9,535,154 B2
(45) Date of Patent: Jan. 3, 2017

(54) CACHE-BASED LOCATION DETERMINATION

(75) Inventors: Dino Natucci, Tacoma, WA (US);
Mark Inderhees, Bellevue, WA (US);
Robert Dufalo, Tacoma, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 941 days.

(21) Appl. No.: 13/230,321

(22) Filed: Sep. 12, 2011

(65) Prior Publication Data

US 2013/0063309 A1   Mar. 14, 2013

(51) Int. Cl.
| | |
|---|---|
| *G01S 3/02* | (2006.01) |
| *G01S 5/02* | (2010.01) |
| *G01S 19/34* | (2010.01) |
| *G01S 1/68* | (2006.01) |
| *G01S 1/00* | (2006.01) |

(52) U.S. Cl.
CPC ............. *G01S 5/0252* (2013.01); *G01S 1/00* (2013.01); *G01S 1/68* (2013.01); *G01S 5/0289* (2013.01); *G01S 19/34* (2013.01)

(58) Field of Classification Search
CPC ...... G01S 5/0252; G01S 5/0289; G01S 5/242; G01S 1/00; G01S 1/68; G01S 19/34; G01S 5/202
USPC .......................................................... 342/451
See application file for complete search history.

(56) References Cited

U.S. PATENT DOCUMENTS

| | | | | |
|---|---|---|---|---|
| 799,742 | A * | 9/1905 | Lowry ............................ | 56/38 |
| 6,420,994 | B1 * | 7/2002 | Chumbley ............. | G01S 13/75 |
| | | | | 342/118 |
| 6,594,483 | B2 | 7/2003 | Nykanen et al. | |
| 6,839,560 | B1 * | 1/2005 | Bahl et al. ................. | 455/456.1 |
| 7,107,065 | B2 * | 9/2006 | Overy et al. ............... | 455/456.2 |
| 7,305,245 | B2 * | 12/2007 | Alizadeh-Shabdiz | |
| | | | et al. .......................... | 455/456.6 |
| 7,403,762 | B2 * | 7/2008 | Morgan et al. ............. | 455/404.2 |
| 7,414,988 | B2 * | 8/2008 | Jones et al. .................... | 370/328 |
| 7,433,694 | B2 * | 10/2008 | Morgan et al. ............. | 455/456.1 |
| 7,471,954 | B2 * | 12/2008 | Brachet et al. ............ | 455/456.5 |
| 7,474,897 | B2 * | 1/2009 | Morgan et al. ............ | 455/456.5 |

(Continued)

OTHER PUBLICATIONS

Amini et al., "Caché: Caching Location-Enhanced Content to Improve User Privacy", Retrieved at <<http://www.cs.mu.edu/~jklindqv/CMUCyLab10019.pdf>>, In Proceedings of the 9th international conference on Mobile systems, applications, and services, CMU-CyLab-10-019, Dec. 10, 2010, pp. 19.

(Continued)

*Primary Examiner* — Frank J McGue
(74) *Attorney, Agent, or Firm* — Brandon Roper; Judy Yee; Micky Minhas (57) ABSTRACT

One disclosed example provides a method including compiling and storing on the computing device a list of positioning signals each associated with a geographic location, detecting one or more currently available positioning signals, comparing the one or more currently available positioning signals to the list of positioning signals, and if one or more currently available positioning signals matches one or more matching positioning signals stored in the list, then determining the current geographic location based upon the one or more matching stored positioning signals.

19 Claims, 5 Drawing Sheets

(56) References Cited

U.S. PATENT DOCUMENTS

| | | | |
|---|---|---|---|
| 7,493,127 B2* | 2/2009 | Morgan et al. | 455/456.5 |
| 7,502,620 B2* | 3/2009 | Morgan et al. | 455/456.6 |
| 7,515,578 B2* | 4/2009 | Alizadeh-Shabdiz et al. | 370/338 |
| 7,551,579 B2* | 6/2009 | Alizadeh-Shabdiz et al. | 370/328 |
| 7,551,929 B2* | 6/2009 | Alizadeh-Shabdiz et al. | 455/456.1 |
| 7,647,164 B2 | 1/2010 | Reeves | |
| 7,768,963 B2* | 8/2010 | Alizadeh-Shabdiz | 370/328 |
| 7,818,017 B2* | 10/2010 | Alizadeh-Shabdiz et al. | 455/456.6 |
| 7,835,754 B2* | 11/2010 | Alizadeh-Shabdiz et al. | 455/456.1 |
| 7,856,234 B2* | 12/2010 | Alizadeh-Shabdiz et al. | 455/456.1 |
| 7,916,661 B2* | 3/2011 | Alizadeh-Shabdiz et al. | 370/252 |
| 8,014,788 B2* | 9/2011 | Alizadeh-Shabdiz et al. | 455/456.1 |
| 8,019,357 B2* | 9/2011 | Alizadeh-Shabdiz et al. | 455/456.1 |
| 8,022,877 B2* | 9/2011 | Alizadeh-Shabdiz | 342/458 |
| 8,031,657 B2* | 10/2011 | Jones et al. | 370/328 |
| 8,054,219 B2* | 11/2011 | Alizadeh-Shabdiz | 342/357.31 |
| 8,063,820 B2* | 11/2011 | Alizadeh-Shabdiz | 342/357.73 |
| 8,089,398 B2* | 1/2012 | Alizadeh-Shabdiz | 342/357.29 |
| 8,089,399 B2* | 1/2012 | Alizadeh-Shabdiz | 342/357.31 |
| 8,090,386 B2* | 1/2012 | Alizadeh-Shabdiz et al. | 455/456.1 |
| 8,103,288 B2* | 1/2012 | Alizadeh-Shabdiz et al. | 455/456.1 |
| 8,130,148 B2* | 3/2012 | Alizadeh-Shabdiz | 342/463 |
| 8,140,094 B2* | 3/2012 | Morgan et al. | 455/456.5 |
| 8,144,673 B2* | 3/2012 | Alizadeh-Shabdiz | 370/338 |
| 8,154,454 B2* | 4/2012 | Alizadeh-Shabdiz | 342/458 |
| 8,155,666 B2* | 4/2012 | Alizadeh-Shabdiz | 455/456.1 |
| 8,155,673 B2* | 4/2012 | Alizadeh-Shabdiz et al. | 455/456.5 |
| 8,185,129 B2* | 5/2012 | Alizadeh-Shabdiz | 455/456.1 |
| 8,223,074 B2* | 7/2012 | Alizadeh-Shabdiz | 342/463 |
| 8,229,455 B2* | 7/2012 | Alizadeh-Shabdiz | 455/456.1 |
| 8,242,960 B2* | 8/2012 | Alizadeh-Shabdiz | 342/463 |
| 8,244,272 B2* | 8/2012 | Morgan et al. | 455/456.1 |
| 8,279,114 B2* | 10/2012 | Alizadeh-Shabdiz et al. | 342/357.31 |
| 8,284,103 B2* | 10/2012 | Alizadeh-Shabdiz | 342/458 |
| 8,315,233 B2* | 11/2012 | Alizadeh-Shabdiz | 370/338 |
| 8,369,264 B2* | 2/2013 | Brachet et al. | 370/328 |
| 8,406,785 B2* | 3/2013 | Alizadeh-Shabdiz et al. | 455/456.1 |
| 8,462,745 B2* | 6/2013 | Alizadeh-Shabdiz | 370/338 |
| 8,526,967 B2* | 9/2013 | Alizadeh-Shabdiz et al. | 455/456.1 |
| 8,538,457 B2* | 9/2013 | Morgan et al. | 455/456.1 |
| 2007/0004428 A1* | 1/2007 | Morgan et al. | 455/456.1 |
| 2008/0309556 A1* | 12/2008 | Hohl | 342/451 |
| 2010/0046842 A1 | 2/2010 | Conwell | |
| 2011/0098029 A1 | 4/2011 | Rhoads et al. | |

OTHER PUBLICATIONS

Barkhuus, et al., "Location-Based Services for Mobile Telephony: a study of users' privacy concerns", Retrieved at <<http://www.idemployee.id.tue.nl/g.w.m.rauterberg/conferences/interact2003/INTERACT2003-p709.pdf>>, In Proceedings of the 9th IFIP TC13 International Conference on Human-Computer interaction, Interact, 2003, pp. 709-712.

"Navigation without GPS: define your location using IP, GSM/UMTS and Wi-Fi", Retrieved at <<http://eng.xakep.ru/link/50814/>>, Retrieved Date: Aug. 19, 2011, pp. 5.

Ververidis, et al., "Service Discovery for Mobile Ad Hoc Networks: A Survey of Issues and Techniques", Retrieved at <<http://citeseerx.ist.psu.edu/viewdoc/download?doi=10.1.1.143.3277&rep=rep1&type=pdf>> 2008, pp. 18.

* cited by examiner

CACHE-BASED LOCATION DETERMINATION

BACKGROUND

A computing device application may utilize a determination of a device's location for many location-based services and applications. For example, applications may search for local points of interest, local weather, may automatically tag photos and video with location information, etc.

Location detection is commonly carried out via a global positioning system (GPS) receiver on the device, and/or by communication with remote location services. However, GPS is often not available indoors. Additionally, communication between the computing device and a remote location service may utilize potentially significant computing and communications resources.

SUMMARY

Embodiments related to determining a current geographic location of a computing device are provided. In one example embodiment, a list of positioning signals, each associated with a geographic location, is compiled and stored on the computing device. One or more currently available positioning signals are detected, and the one or more currently available positioning signals are compared to the list of positioning signals. If one or more currently available positioning signals matches one or more matching positioning signals stored in the list, then the current geographic location may be determined based upon the one or more matching positioning signals.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computing devices, such as mobile phones, laptops, and desktop computers, may operate services and applications that may utilize a determination of the computing device's physical location. If available, location determination can be carried out by a GPS on the device. However, under certain conditions, such as when the device is being used indoors, GPS may not function optimally, if at all. In some circumstances, location may be resolved by one or more remote location services that detect the device's location based on proximity to cell phone towers, for example. However, communication between the computing device and the remote location service may be time consuming and/or utilize significant bandwidth.

Therefore, embodiments are disclosed that relate to resolving location via a location cache stored on the computing device, wherein the cache contains a list of network connection points and associated geographic locations. Thus, when a computing device performs a scan for available WIFI (wireless local area network protocols and devices based on IEEE 801.11 standards) or other signals, such as BLUETOOTH (wireless personal area network protocols and devices managed by the Bluetooth Special Interest Group) connections or television signals, the available signals are first compared to a list of known positioning signals stored in the cache, and a current geographic location may be determined based on matching positioning signals stored in the cache. If the available signals are not cached, then the locations may be sent to a remote location service, and the location information received from the remote location service may be stored in the cache. Further, in some embodiments, if one or more detected available signals are not in the list but other available signals are, then the location(s) of those not in the list may be inferred and cached. In this way, current geographic location may be resolved based on information stored in the cache, which may help to avoid contacting the remote location service for location information.

FIGS. 1A-1D show an example embodiment of a method 100 for determining a current geographic location on a computing device. It will be understood that method 100 may be carried out by any suitable computing device. An example computing device is described below with reference to FIG. 2. Method 100 comprises, at 102, compiling a list of positioning signals. The list of positioning signals includes a list of geographic locations of detectable signals and network access points, and may include wireless, wired, cellular and/or any other suitable type of access points that may be detectable by the computing device. Example positioning signals include, but are not limited to, wireless internet access points, IP connections, BLUETOOTH transmitters, television signals, radio frequency networks, and cell phone communication towers.

Figure 1A:
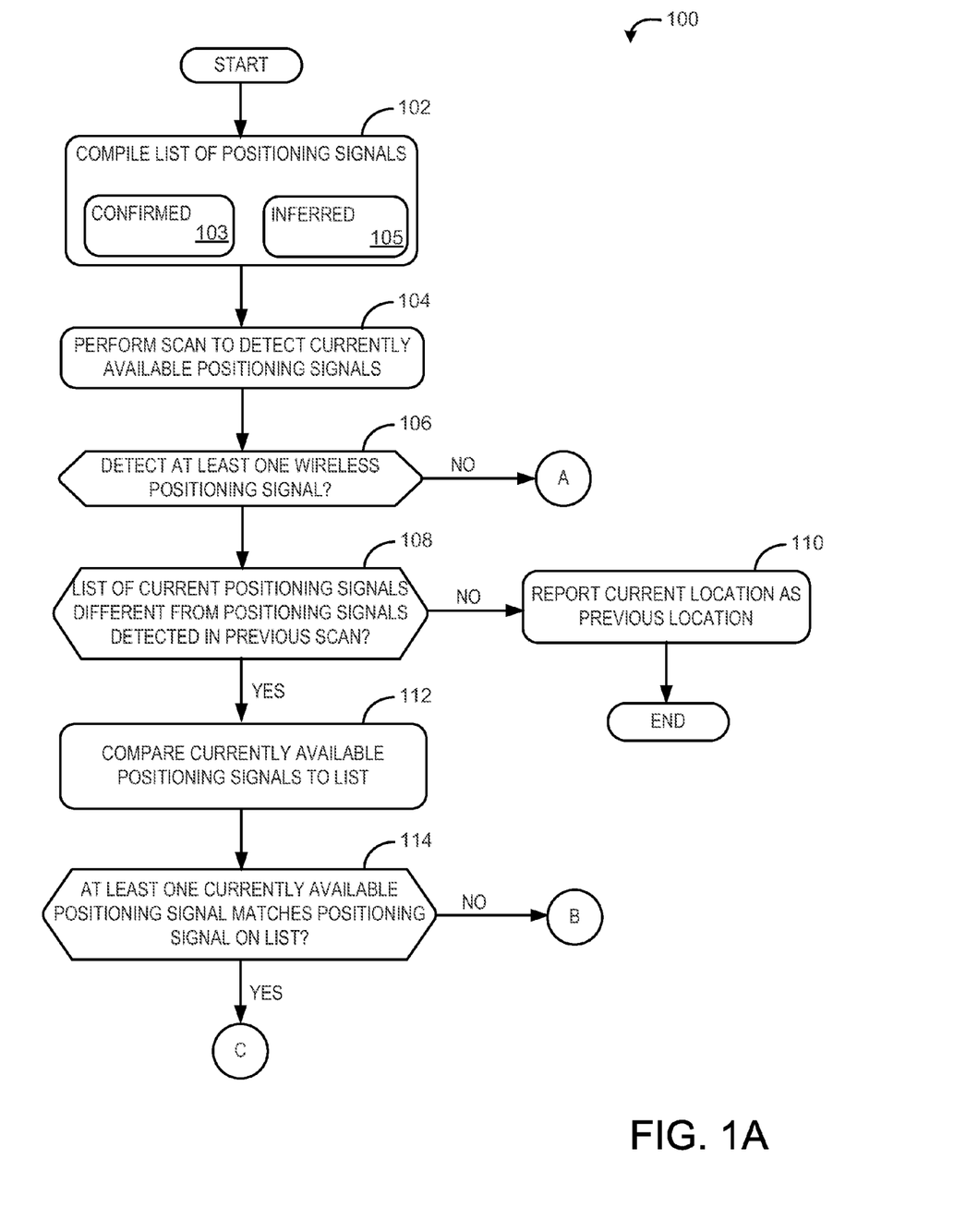
FIGS. 1A-D show flow diagrams depicting an embodiment of determining a current geographic location on a computing device.

The list of positioning signals may be stored on the computing device in a cache that is accessible for determining current geographic location, as will be described in further detail below. The list of positioning signals may be compiled in any suitable manner. For example, in one embodiment, each time the computing device detects available wireless internet connections that are not stored in the cache and/or cannot be inferred, the computing device may contact the remote location service for the locations of each detected positioning signal. Information received from the remote location service is then stored in the cache for later location determinations.

As mentioned above, in some embodiments, the list of positioning signals may include "confirmed" positioning signals 103 and "inferred" positioning signals 105, wherein "confirmed" signals are those wherein the location information has been received from the remote location service and "inferred" signals are those wherein the location information is inferred from nearby signal locations that are stored in the cache. In some embodiments, inferred signals may not be used to infer other locations, while in other embodiments, inferred signals may be used to infer other locations.

In some embodiments, the location service may send information regarding positioning signals other than those currently detected, such as positioning signals in nearby geographic areas, for caching. This may help to build up the cache more quickly, so that location information for nearby geographic areas is proactively stored. For example, in some embodiments, when the computing device receives location information from a remote location service, it may receive the information in the form of "tiles" that include one or more lists of known signals within a particular geographic region corresponding to the tile. Thus, when the computing device requests location information for its current geographic area, it may receive a tile that includes a list of known positioning signals within the geographic region corresponding to the tile. In some instances, all of the positioning signals in the tile then may be stored in the cache as confirmed positioning signals 103, while in other instances, only a subset of the positioning signals may be stored, or none of the positioning signals received from the location service may be stored in the cache.

In some embodiments, the positioning signals stored in the cache may be periodically removed and/or updated in order ensure the information stored in the cache is current and up-to-date. As a more specific example, tiles downloaded from the remote location service may have an expiration date after which the tiles will be deleted, such as after ten days, after fifteen days, or after any suitable amount of time.

Any suitable trigger may be used to trigger the determination of a current geographic location. For example, a location determination may be triggered automatically by an application or service (i.e. software events), by hardware events (e.g. powering up), upon receipt of a user input requesting to perform a location determination, etc.

Continuing with FIG. 1A, method 100 next comprises, at 104, performing a scan to detect currently available positioning signals. As mentioned above, any positioning signal may be detected in the scan, and more than one type of scan may be performed. Example scans include, but are not limited to, scans for nearby wireless internet connection access points (e.g. WiFi or WiMax connections) and cell phone towers within range.

At 106, it is determined if at least one wireless positioning signal is detected. If not, method 100 proceeds to 116 to determine its current geographic location based on an IP address, as will be discussed in more detail with respect to FIG. 1B. If at least one wireless positioning signal is detected, method 100 comprises, at 108, determining if the list of detected currently available positioning signals is different from a list of positioning signals detected in a previous scan. Each time the computing device performs a scan to detect available positioning signals, it may temporarily store the available signal list. The current available positioning signals then may be compared to the list stored from the previous scan. If no differences are determined at 108, the computing device infers that its location has not changed, and proceeds to 110 to report the current geographic location as the same location as the previously reported geographic location. On the other hand, if any differences are detected in the lists of previous and current connections, method 100 proceeds to 112 to compare the currently available positioning signals to the entire list of positioning signals in the cache.

At 114, method 100 determines if at least one currently available positioning signal matches a positioning signal stored on the list in the cache. If it is determined that no currently available positioning signals match a positioning signal on the list, method 100 proceeds to 124 to determine the location based on information from a remote location service, as will be described below in more detail with respect to FIG. 1C. On the other hand, if at least one currently available positioning signal matches a positioning signal on the list, method 100 proceeds to 140 to determine the location based on the matching connections, as described in more detail with respect to FIG. 1D.

Figure 1B:
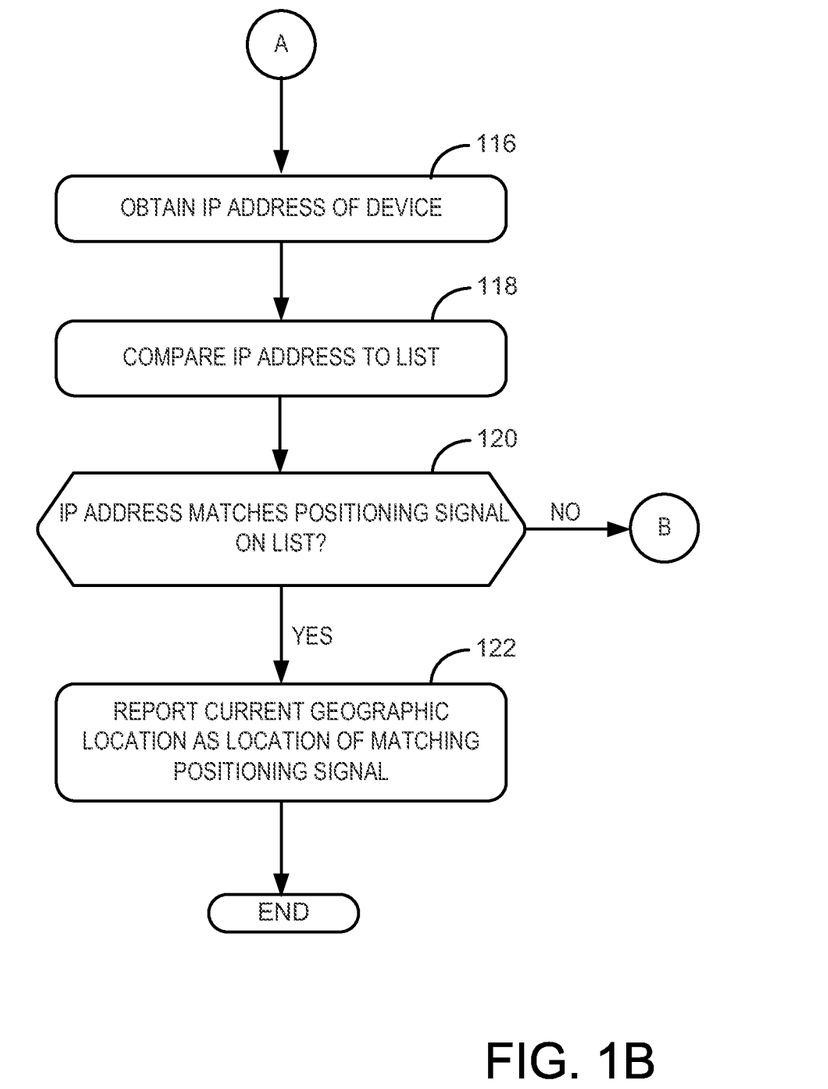

FIG. 1B is a flow chart depicting a continuation of method 100. At 116, method 100 comprises obtaining an IP address of the computing device to use as the currently available positioning signal. Obtaining the IP address may be performed, for example, in response to determining at 106 that no currently available wireless positioning signals have been detected. In this situation, the computing device may use its IP address as a currently available positioning signal. At 118, the detected IP address is compared to the positioning signal list, and at 120, it is determined if the IP address matches a cached positioning signal on the list. If the IP address does not match a positioning signal on the list, then method 100 proceeds to 124 to determine the location based on information received from the remote location service, described in more detail with respect to FIG. 1C. On the other hand, if the IP address does match a positioning signal on the list, method 100 proceeds to 122 to report the current geographic location as the location of the matching signal.

Figure 1C:
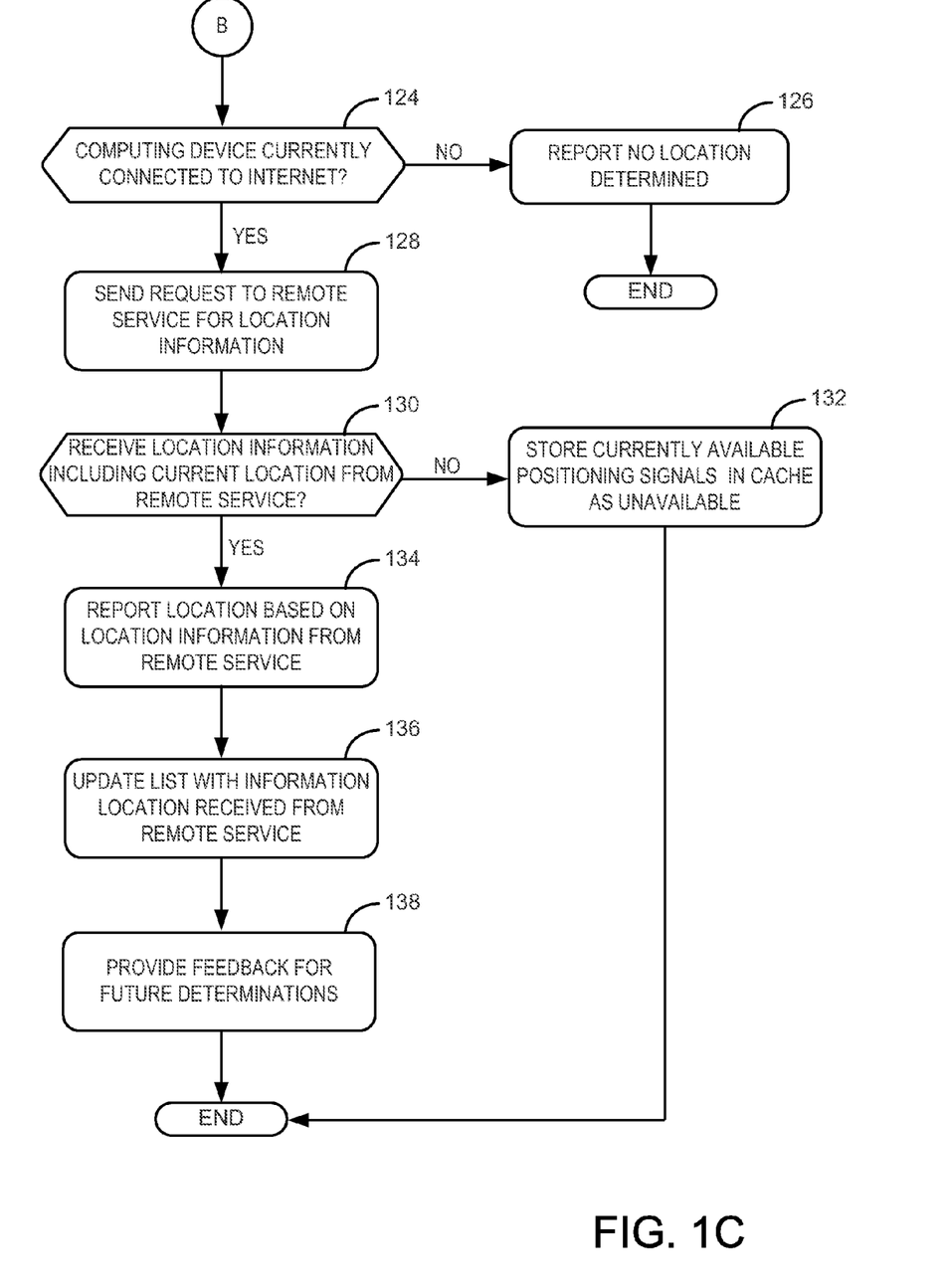

FIG. 1C is a flow chart further depicting a continuation of method 100, either from the determination at 114 that at least one of the currently available positioning signals does not match a positioning signal on the list, or from the determination at 120 that the detected IP address does not match a positioning signal on the list. At 124, method 100 comprises determining if the computing device is currently connected to the Internet. If not, communication with the remote location service is not enabled, and thus the location of the computing device cannot be determined. As a result, at 126, method 100 comprises reporting a status of no location determined.

On the other hand, if the device is connected to the Internet, method 100 proceeds to 128 to send a request to the remote service for location information. At 130, method 100 comprises determining if the requested location information including current location has been received from the remote service. If no location information was received that indicates the device's current geographic location, then method 100 proceeds to 132 to store the currently available positioning signals, IP address(es), etc. that have been detected in the cache as "location unavailable." In this way, any future location determinations carried out at the current geographic location will report a status of location unavailable, and unnecessary communication with the remote service may be avoided.

On the other hand, if location information including the current geographic location is received from the remote service, then method 100 proceeds to 134 to report the current location based on the location received from the remote service. Additionally, at 136, the list of positioning signals in the cache may be updated with the location information received from the remote service. For example, any new positioning signals that are received from the location service can be stored in the cache, and any inferred signals already in the cache that are now confirmed by the location service may be updated to confirmed locations.

Further, in some embodiments, feedback may be provided to outside parties, such as the remote location service, manufacturer or administrator of the computing device, manufacturer or administrator of the location determination module, etc., in order to improve future location determinations. This is illustrated at 138 in FIG. 1C. The feedback may comprise any suitable available positioning signal, including but not limited to an on-device global navigation satellite system (GNSS), attached GNSS device, or remotely connected GNSS device. This feedback may be optional, that is, it may be provided only if authorized by a user of the device, or if authorized by an administrator or manufacturer.

Figure 1D:
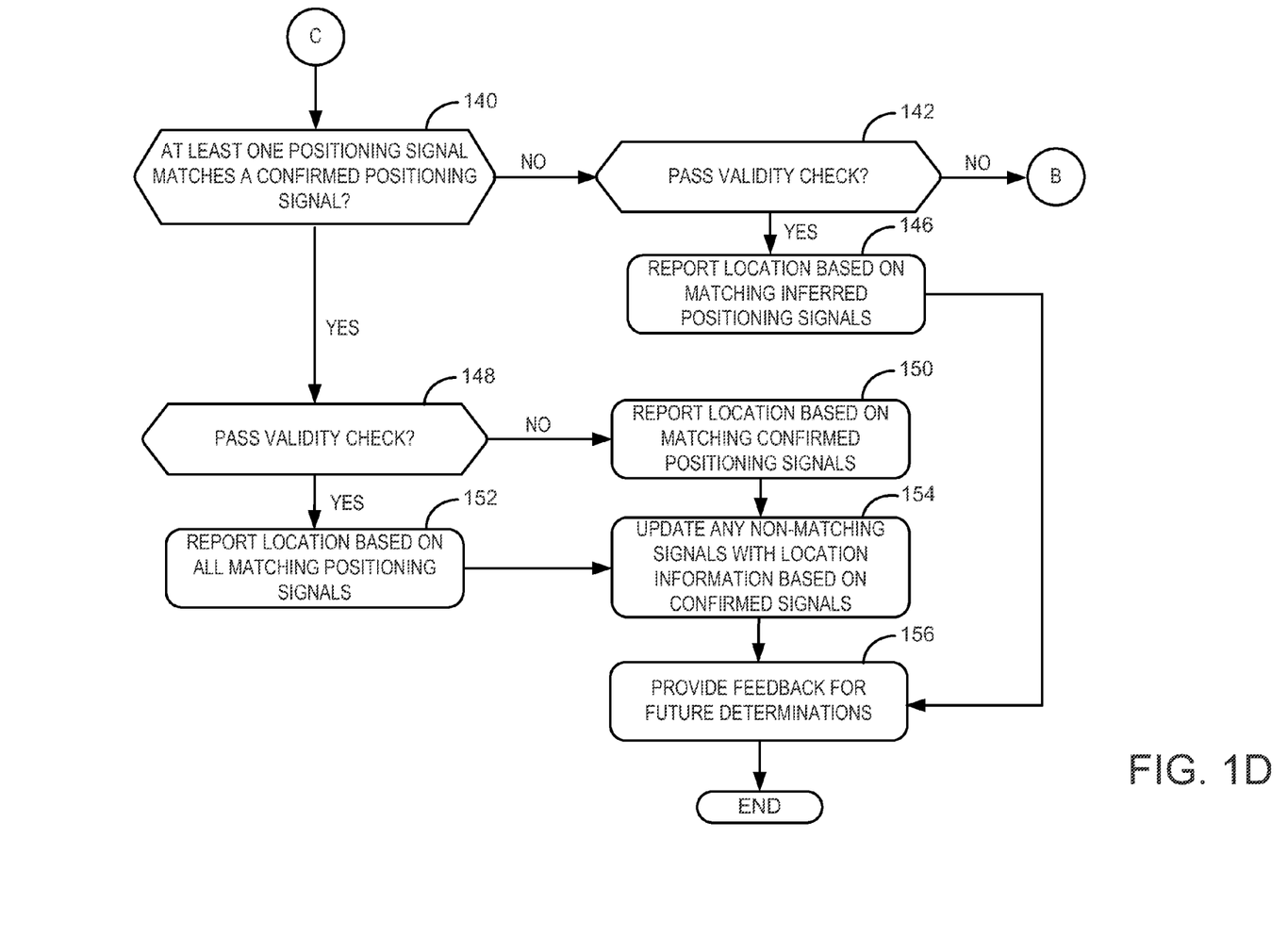

FIG. 1D is a flow chart depicting a continuation of method 100, continued from the determination at 114 that at least one currently available positioning signal matches a positioning signal stored on the list. At 140, method 100 comprises determining if at least one currently available positioning signal matches a confirmed positioning signal from the list. As described above with respect to FIG. 1A, confirmed positioning signals are those signals whose locations have been confirmed by the remote location service. If it is determined at 140 that no currently available positioning signals match a confirmed signal, then the currently available positioning signals that match a positioning signal on the list match only inferred signals.

Method 100 then proceeds to 142 to determine if the matching positioning signals pass a validity check. The validity check is performed in order to help ensure that the reported locations are valid and reasonable, and thus trustworthy in being used to determine the current geographic location. Any suitable validity check may be performed. For example, in some embodiments, the validity check may comprise determining that the detected positioning signals that match a positioning signal from the list (and thus, have a known geographic location associated with them) are located within a reasonable distance of each other. For example, if two positioning signals are located within 100 feet of each other while a third is located a mile away, the third positioning signal may not pass the validity check. It will be understood that this validity check is described for the purpose of example, and is not intended to be limiting in any manner.

If the positioning signals do not pass the validity check at 142, then method 100 proceeds to 124, described above with respect to FIG. 1C, wherein Internet connectivity is determined. If the device is not connected to the Internet, then the location may not be reported, as inferred positioning signals that don't pass validation may not result in an accurate location determination. Likewise, if the device is connected to the Internet, the remote locating service may be contacted for location information.

On the other hand, if the positioning signals do pass the validity check at 142, then method 100 proceeds to 146 to report the current location based on the matching inferred positioning signals from the list, for example, the current location may be reported as the average of the locations of the matching inferred positioning signals from the list, or in any other suitable manner. Method 100 then optionally proceeds to 156 to provide feedback, as described with respect to FIG. 1C.

Returning to 140, if it is determined that at least one currently available positioning signal matches a confirmed positioning signal from the list, then method 100 proceeds to 148 to perform a validity check on the matching positioning signals. If any matching positioning signals do not pass the validity check, there may still be enough confidence with the matching positioning signals to report a location based upon the location of the confirmed signals. Thus, at 150, the current location is reported based on the matching confirmed, but not inferred, positioning signals. If the matching positioning signals do pass the validity check, then all the matching positioning signals, both inferred and confirmed, may be used to determine the location reported at 152 (e.g. by averaging, or in any other suitable manner). Both 150 and 152 result in a location being determined from the cache based on matching positioning signals. Thus, both proceed to 154 to infer the location of any non-matching currently available positioning signals based upon identification of the location of the matching confirmed positioning signals. These positioning signals can then be stored in the cache as inferred positioning signals. Further, at 156, feedback may be provided to improve future location determinations.

Method 100 thus provides for determining a computing device's current geographic location via locally stored information in many cases, thereby potentially conserving bandwidth that would otherwise be used contacting a remote location service. Further, if location cannot be determined by the cache, the remote service may be contacted to provide the location information and to update the cache with more information.

It will be understood that the embodiments described herein may offer multiple levels of security. For example, control of information sent from and received at the device while carrying out the above described embodiments may be managed by one or more of an IT manager of the computing device, a user of the device, and a manufacturer of the device, location service, or location-based application. For example, access to the location information received from the location service, distribution of the reported location to one or more applications on the device requesting location information, and the feedback provided to the outside sources as described above, may be controlled by an IT manager or user in order to preserve a desired level of privacy on the computing device.

As mentioned above, the above described methods and processes may be performed on a computing system including one or more computers. In particular, the methods and processes described herein may be implemented as a computer application, computer service, computer API, computer library, and/or other computer program product.

Figure 2:
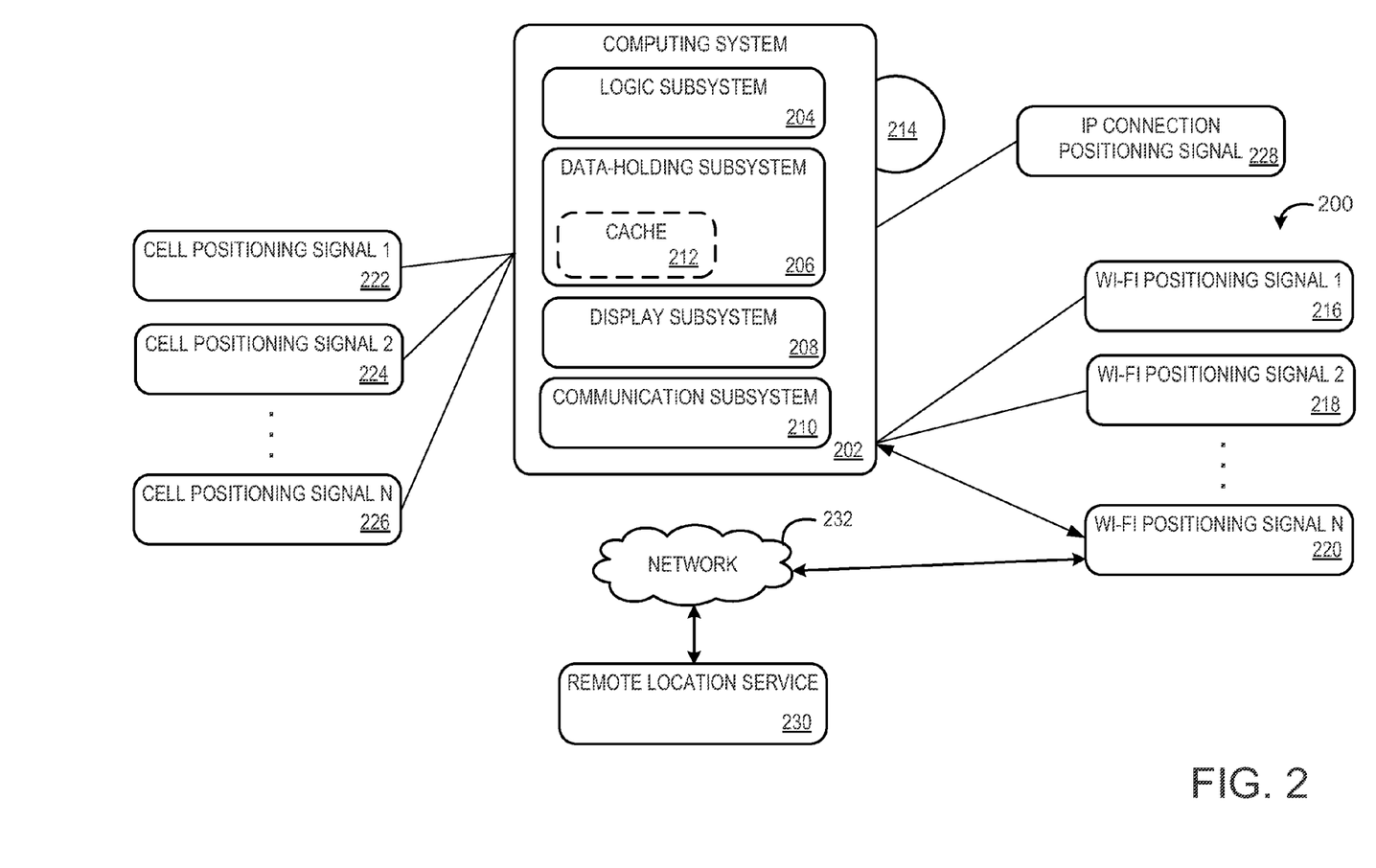
FIG. 2 schematically shows an example computing system according to an embodiment of the present disclosure.

FIG. 2 schematically shows an example usage environment 200 including a nonlimiting computing system 202 that may perform one or more of the above described methods and processes. Computing system 202 is shown in simplified form. It is to be understood that virtually any computer architecture may be used without departing from the scope of this disclosure. In different embodiments, computing system 202 may take the form of a desktop computer, laptop computer, tablet computer, home entertainment computer, network computing device, mobile computing device, mobile communication device, gaming device, etc.

Computing system 202 includes a logic subsystem 204 and a data-holding subsystem 206. Computing system 202 may optionally include a display subsystem 208, communication subsystem 210, and/or other components not shown in FIG. 2. Computing system 202 may also optionally include user input devices such as keyboards, mice, game controllers, cameras, microphones, and/or touch screens, for example.

Logic subsystem 204 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 206 may include one or more physical, non-transitory, devices configured to hold data and/or instructions executable by the logic subsystem to implement the herein described methods and processes. When such methods and processes are implemented, the state of data-holding subsystem 206 may be transformed (e.g., to hold different data).

Data-holding subsystem 206 may include removable media and/or built-in devices. Data-holding subsystem 206 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 206 may include devices with one or more of the following characteristics: volatile, nonvolatile, dynamic, static, read/write, read-only, random access, sequential access, location addressable, file addressable, and content addressable. In some embodiments, logic subsystem 204 and data-holding subsystem 206 may be integrated into one or more common devices, such as an application specific integrated circuit or a system on a chip.

As described above, data-holding subsystem 206 includes a cache 212 configured to hold location information. The cache 212 may comprise a list of confirmed and inferred positioning signals compiled by computing system 202 and used to determine the system's current geographic location.

FIG. 2 also shows an aspect of the data-holding subsystem in the form of removable computer-readable storage media 214, which may be used to store and/or transfer data and/or instructions executable to implement the herein described methods and processes. Removable computer-readable storage media 214 may take the form of CDs, DVDs, HD-DVDs, Blu-Ray Discs, EEPROMs, and/or floppy disks, among others.

It is to be appreciated that data-holding subsystem 206 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 202 that is implemented to perform one or more particular functions. In some cases, such a module, program, or engine may be instantiated via logic subsystem 204 executing instructions held by data-holding subsystem 206. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 208 may be used to present a visual representation of data held by data-holding subsystem 206. As the herein described methods and processes change the data held by the data-holding subsystem, and thus transform the state of the data-holding subsystem, the state of display subsystem 208 may likewise be transformed to visually represent changes in the underlying data. Display subsystem 208 may include one or more display devices utilizing virtually any type of technology. Such display devices may be combined with logic subsystem 204 and/or data-holding subsystem 206 in a shared enclosure, or such display devices may be peripheral display devices.

When included, communication subsystem 210 may be configured to communicatively couple computing system 202 with one or more other computing devices. Communication subsystem 210 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 202 to send and/or receive messages to and/or from other devices via a network such as the Internet.

Further, as described above, computing system 202 may be configured to detect one or more wireless local area network connections, such as wi-fi positioning signal 1 216, wi-fi positioning signal 2 218, and wi-fi positioning signal N 220, and to communicate with a remote location service 230 over a network via these or other connection(s) (as illustrated by wireless positioning signal n). Other example wireless positioning signals include cellular positioning signal 1 222, cellular positioning signal 2 224, and cellular positioning signal N 226, as well as wired positioning signal IP connection positioning signal 228.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method comprising:
obtaining, from a remote location information service, a list of positioning signals each associated with a geographic location;
locally storing the list of positioning signals to form a locally-stored list;
receiving, by a wireless communication device in communication with a processor, one or more currently available positioning signals;

comparing, by the processor, the one or more currently available positioning signals to the locally-stored list;

after comparing the one or more currently available positioning signals to the locally-stored list, when any of the one or more currently available positioning signals matches one or more matching positioning signals stored in the locally-stored list, then determining, by the processor, a current geographic location of the computing device based upon the one or more matching stored positioning signals, reporting, by the processor, the current geographic location to an application on the computing device, and when a currently available wireless positioning signal does not match any positioning signals on the locally-stored list, then inferring, by the processor, an associated location for the currently available wireless positioning signal to form an inferred positioning signal, and adding the inferred positioning signal to the locally-stored list; and after comparing the one or more currently available positioning signals to the locally-stored list, when no currently available positioning signals match any positioning signal stored in the locally-stored list, sending a request to the remote location information service for location information.

2. The method of claim 1, further comprising, in response to receiving location information from the remote location information service, updating the locally-stored list with any new positioning signals received from the remote location information service.

3. The method of claim 1, further comprising, where no location information is received from the remote location information service, storing the currently available positioning signals on the locally-stored list as location unavailable.

4. The method of claim 1, wherein comparing the one or more currently available positioning signals to the locally-stored list of positioning signals further comprises:

when one or more of the one or more currently available positioning signals matches a confirmed positioning signal stored in the locally-stored list, then performing a validity check on each currently available positioning signal; and when a currently available positioning signal does not pass the validity check, then determining the current geographic location based only on currently available positioning signals that match a confirmed positioning signal stored in the locally-stored list.

5. The method of claim 1, wherein comparing the one or more currently available positioning signals to the locally stored list of positioning signals further comprises:

when all the currently available positioning signals match only inferred positioning signals stored in the locally-stored list, then performing a validity check on the currently available positioning signals;

when the currently available positioning signals pass the validity check, determining the current geographic location based on currently available positioning signals that match a positioning signal stored in the locally-stored list; and when the currently available positioning signals do not pass the validity check, then sending a request to a remote location information service for location information.

6. The method of claim 1, further comprising, when one or more of the one or more currently available positioning signals matches a positioning signal stored in the locally-stored list, then determining the current geographic location based upon the one or more matching stored positioning signals and providing feedback to a remote location information service.

7. The method of claim 1, further comprising determining the current geographic location of the computing device only if authorized by a user, administrator, and/or manufacturer of the computing device.

8. The method of claim 1, wherein the positioning signals comprise wireless internet connection access points.

9. The method of claim 1, wherein the positioning signals comprise one or more of cell phone communication towers, BLUETOOTH transmitters, radio frequency networks, and IP connection locations.

10. The method of claim 1, further comprising analyzing, by the processor, the one or more currently available positioning signals to determine an address of each of the one or more currently available positioning signals, and wherein comparing the position signals to the locally-stored list comprises comparing each address to addresses in the locally-stored list.

11. A computing device, comprising:
a wireless communication device; and
a processor in communication with the wireless communication device, the processor being configured to
  obtain, from a remote location information service, a list of positioning signals each associated with a geographic location;
  locally store the list of positioning signals to form a locally-stored list;
  receive, by the wireless communication device, one or more currently available wireless positioning signals;
  compare, by the processor, the one or more currently available wireless positioning signals to the locally-stored list;
  after comparing the one or more currently available positioning signals to the locally-stored list, when any of the one or more currently available wireless positioning signals matches a matching positioning signal stored in the locally-stored list, then
    determine, by the processor, a current geographic location based upon the matching positioning signal,
    report, by the processor, the current geographic location to an application on the computing device, and
    for a currently available positioning signal that does not match any positioning signal on the locally stored list, infer, by the processor, an associated location based upon an identification of one or more known positioning signals detectable to form an inferred location, and add, by the processor, the inferred location to the locally stored list as an inferred positioning signal; and
  after comparing the one or more currently available positioning signals to the locally-stored list, when no currently available wireless positioning signals match any positioning signal stored in the locally-stored list, then send a request to the remote location information service for location information.

12. The computing device of claim 11, wherein the processor is further configured to:
detect an IP address location if no currently available wireless positioning signals are detected;

compare the IP address location to the locally stored list of positioning signals;

when the IP address location matching a matching positioning signal stored in the locally stored list, then determine the current geographic location based upon the matching positioning signal; and when the IP address location not matching a positioning signal stored in the locally stored list, then send the request to a remote service for location information.

13. The computing device of claim 11, wherein the processor is further configured to update the locally-stored list with any new positioning signals received from a remote service in response to a request for location information.

14. The computing device of claim 11, wherein the computing device comprises a mobile device, and wherein the wireless communication device is configured for communication with one or more of a wireless telephone network, a wireless local area network, and a wireless wide area network.

15. The computing device of claim 11, wherein the processor is configured to analyze the one or more currently available positioning signals to determine an address of each of the one or more currently available positioning signals, and to compare each address to addresses in the locally-stored list.

16. A computing device, comprising:

a wireless communication device; and a processor in communication with the wireless communication device, the processor being configured to:

obtain, from a remote location information service, a list of wireless positioning signals;

locally store the list of wireless positioning signals to form a locally-stored list;

receive, by the wireless communication device, one or more currently available wireless positioning signals;

compare, by the processor, the one or more currently available positioning signals to the locally-stored list;

after comparing the one or more currently available positioning signals to the locally-stored list, when any of the one or more currently available wireless positioning signals matches one or more positioning signals in the locally stored list, then determine, by the processor, a current geographic location based upon the one or more currently available wireless positioning signals that match the one or more positioning signals in the locally-stored list, report, by the processor, the current geographic location to an application on the computing device, and infer, by the processor, a location for any currently available wireless positioning signal that does not match any positioning signals on the locally-stored list to form an inferred positioning signal, and add the inferred positioning signal to the locally-stored list; and after comparing the one or more currently available positioning signals to the locally-stored list, when no currently available positioning signals match any positioning signal stored in the locally-stored list, then send a request to the remote location information service for location information.

17. The computing device of claim 16, wherein the processor is further configured to receive location information from a remote service and to update the locally-stored list based on the location information from the remote service.

18. The computing device of claim 17, wherein the location information received from the remote service comprises one or more lists of known internet connections within a geographic area that includes the current geographic location.

19. The computing device of claim 16, the computing device comprises a mobile device, and wherein the wireless communication device is configured for communication with one or more of a wireless telephone network, a wireless local area network, and a wireless wide area network.

* * * * *